(12) United States Patent
Bucelot et al.

(10) Patent No.: US 8,736,342 B1
(45) Date of Patent: May 27, 2014

(54) CHANGING RESONANT CLOCK MODES

(71) Applicant: International Business Machines Corporation, Armonk, NY (US)

(72) Inventors: Thomas J. Bucelot, Wappingers Falls, NY (US); Alan Drake, Austin, TX (US); Joshua D. Friedrich, Round Rock, TX (US); Jason D. Hibbeler, Williston, VT (US); Liang-Teck Pang, White Plains, NY (US); William R. Reohr, Ridgefield, CT (US); Phillip John Restle, Katonah, NY (US); Gregory S. Still, Raleigh, NC (US); Michael G. R. Thomson, Bedford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/719,408

(22) Filed: Dec. 19, 2012

(51) Int. Cl.
*G06F 1/10* (2006.01)

(52) U.S. Cl.
CPC ....................................... *G06F 1/10* (2013.01)
USPC .................... 327/304; 327/291; 331/117 D

(58) Field of Classification Search
CPC ........................................................ G06F 1/10
USPC ................. 327/291, 292, 293, 295, 299, 304; 331/36 R, 36 L, 116 R, 117 D
See application file for complete search history.

(56) References Cited

U.S. PATENT DOCUMENTS

| | | | |
|---|---|---|---|
| 7,015,765 B2 | 3/2006 | Shepard et al. | |
| 7,237,217 B2 | 6/2007 | Restle et al. | |
| 7,880,551 B2 | 2/2011 | Chan et al. | |
| 2011/0084736 A1* | 4/2011 | Papaefthymiou et al. | .... 327/108 |
| 2011/0084774 A1* | 4/2011 | Papaefthymiou et al. | ........ 331/117 FE |
| 2011/0140753 A1 | 6/2011 | Papaefthymiou et al. | |
| 2013/0194018 A1* | 8/2013 | Papaefthymiou et al. | .... 327/291 |

FOREIGN PATENT DOCUMENTS

WO     2011046974     4/2011

OTHER PUBLICATIONS

Chan, Steven C. et al., "A Resonant Global Clock Distribution for the Cell Broadband Engine Processor", IEEE Journal of Solid-State Circuits, vol. 44, No. 1 Jan. 1, 2009, 9 pages.

Sathe, Visvesh et al., "Resonant Clock Design for a Power-efficient, High-volume x86-64 Microprocessor", ISSCC Piledriver Final Submission 2012, 13 pages.

Venkataraman, Ganesh et al., "Practical Techniques to Reduce Skew and Its Variations in Buffered Clock Networks", Dept. of Electrical Engineering, Texas A&M University, College Station, TX 77843 2005, 5 pages.

(Continued)

*Primary Examiner* — Lincoln Donovan
*Assistant Examiner* — Jung H Kim
(74) *Attorney, Agent, or Firm* — DeLizio Gilliam, PLLC

(57) ABSTRACT

Described is an integrated circuit having a clock distribution network capable of transitioning from a non-resonant clock mode to a first resonant clock mode Transitions between clock modes or between various resonant clock frequencies are done gradually over a series of clock cycles. In example, when transitioning from a non-resonant clock mode to a first resonant clock mode, a strength of a clock sector driver is reduced over a series of clock cycles, and individual ones of a plurality of resonant switches associated with resonant circuits are modified in coordination with reducing the strength of the clock sector driver.

23 Claims, 9 Drawing Sheets

(56) References Cited

OTHER PUBLICATIONS

Ziesler, Conrad H. et al., "Energy Recovering ASIC Design", Advanced Computer Architecture Laboratory, Department of Electrical Engineering and Computer Science, University of Michigan, Ann Arbor, MI 2003, 6 pages.

"Addressing the Power-Performance IC Design Conundrum", Cyclos Semiconductor, Berkeley, CA Jun. 5, 2011, 17 pages.

* cited by examiner ced circuit.

CHANGING RESONANT CLOCK MODES

FIELD OF INVENTION

Embodiments of the inventive subject matter generally relate to the field of clock distribution in digital devices, and, more particularly, to changing between resonant and non-resonant clock modes in a clock distribution network of an integrated circuit.

BACKGROUND

In an integrated circuit system (such as microprocessors, application-specific integrated circuits (ASICs), system-on-a-chip (SOC) devices, Very Large Scale Integration (VLSI) chips, or other computer processor system), a clock signal is used to define a time reference (e.g. clock rate) for the movement of data within the integrated circuit system. Typically, the clock signal controls the functions of various parts of an integrated circuit by propagating the clock signal to the various parts. Clock jitter occurs when the clock signal is not consistent in the periodic clock pulses. Clock skew occurs when clock pulses arrive to various parts of an integrated circuit at different times. Clock jitter and clock skew are problems which affect the proper operation of the integrated circuit. Recent efforts have been made to minimize jitter and skew and to reduce the power needed to send a clock signal to various parts of an integrated circuit.

A global clock signal may be propagated to the various parts of the integrated circuit using a clock distribution network (such as a clock tree, or clock mesh). A clock distribution network often takes a significant fraction of the power consumed by an integrated circuit. More recently, traditional clock distribution networks have been improved through the use of resonant clocking. Resonant clocking involves the recycling of energy between a capacitor and an inductor. The energy is exchanged between the capacitor (C) and the inductor (L), causing changes in the magnetic field. The changes in the magnetic field cause the energy to be exchanged in the other direction. Resonance occurs due to the periodic exchange of energy over circuit between the capacitor and inductor (also referred to as LC circuit, LC oscillator, LC tank, or tank circuit).

Resonant clocking requires less power to maintain a consistent clock signal. Resonant clock mesh circuits take advantage of resonant clocking in a group of LC circuits linked to a clock distribution network. Traditionally, resonant clock mesh circuits have been designed for a particular resonant frequency based upon the electrical characteristics of the LC circuits. A resonant frequency of the resonant clock mesh may be associated with a particular clock rate of the integrated circuit.

SUMMARY

In this disclosure, provided are methods and apparatus for controlling a plurality of resonant switches of a clock distribution network to transition between a non-resonant clock mode and a resonant clock mode. Transitioning between non-resonant and resonant clock modes may include changing (e.g. reducing or increasing) a strength of a clock sector driver (also referred to as clock sector buffer) over a series of clock cycles, and modifying individual ones of a plurality of resonant switches associated with resonant circuits in coordination with changing the strength of the clock sector driver. Modifying the individual ones of the plurality of resonant switches may include gradually enabling (e.g. stepwise) quantities of the resonant switches corresponding to resonant circuits. Modifying the individual ones of the plurality of resonant switches may include progressively damping or undamping the corresponding resonant circuits using tunable resistors.

BRIEF DESCRIPTION OF THE DRAWINGS

The present embodiments may be better understood, and numerous objects, features, and advantages made apparent to those skilled in the art by referencing the accompanying drawings in which like reference numbers refer to substantially similar features throughout the drawings.

DESCRIPTION OF EMBODIMENT(S)

Figure 1:
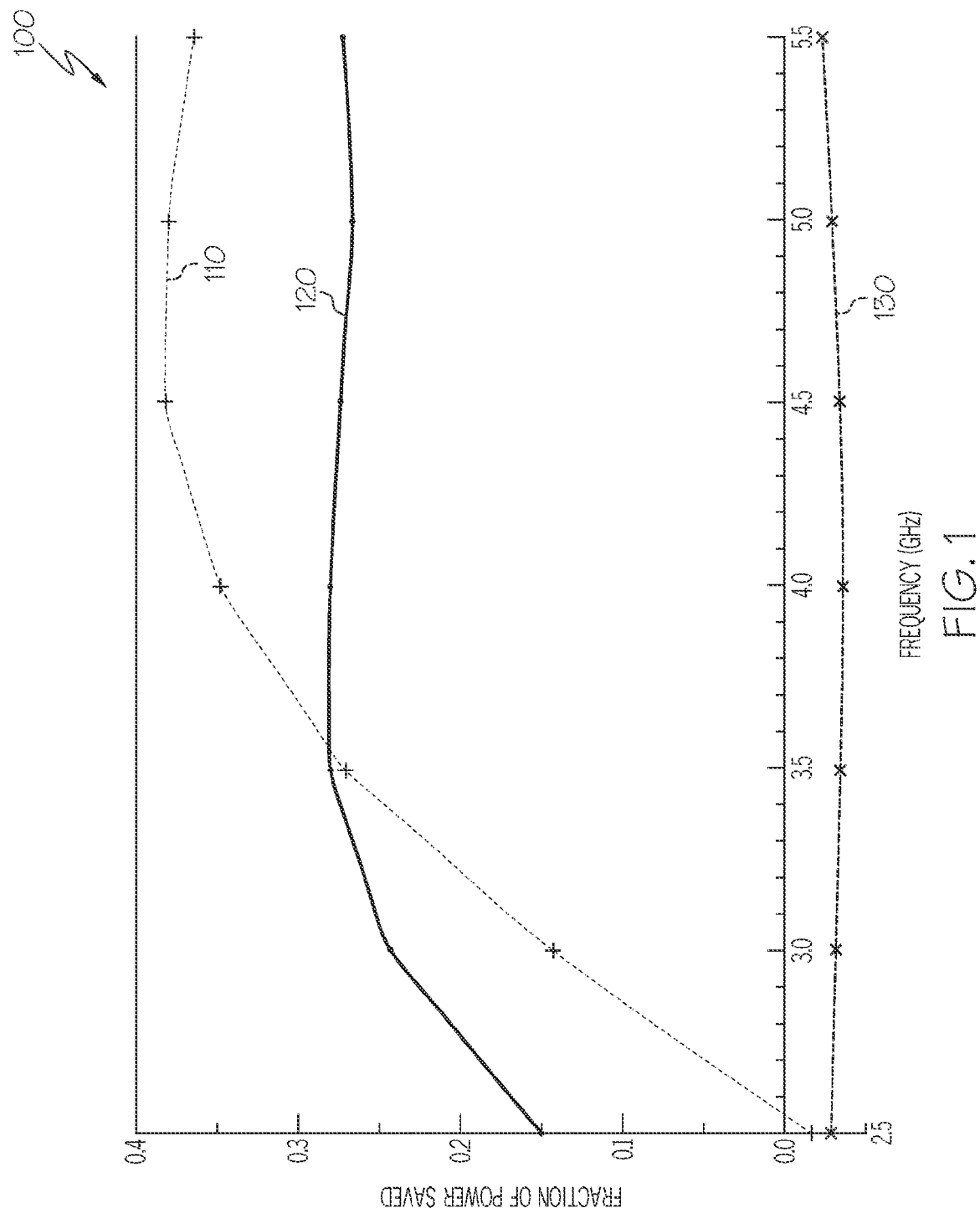
FIG. 1 depicts a graph of power savings associated with various resonant clock modes as compared to a traditional non-resonant clock mode in accordance with an embodiment of the present disclosure.

The description that follows includes exemplary systems, methods, techniques, instruction sequences and computer program products that embody techniques of the present inventive subject matter. However, it is understood that the described embodiments may be practiced without these specific details. For instance, although examples refer to changing between resonant and non-resonant clock modes, alternative implementations of this disclosure may be used in varying resonant frequency or other clocking features. In other instances, well-known instruction instances, protocols, structures and techniques have not been shown in detail in order not to obfuscate the description.

Avoiding clock distortion (clock jitter and clock skew) is a goal in integrated circuit design. Global clock distribution networks may be designed to minimize clock distortion by controlling the electrical characteristics of the global clock distribution network. In a resonant clock mesh, the inductance and a capacitance of the LC circuits may be determined based on the resonant frequency needed for the clock rate. In some integrated circuits, it is desirable to adjust the clock rate based upon the performance requirements or utilization of the integrated circuit. For example, while a higher frequency clock rate may be needed for short durations, a lower frequency clock rate may be used during other times. Power savings may be achieved by adjusting the clock rate frequency based on the integrated circuit demands. Typically a lower frequency clock rate utilizes less power than a high frequency clock rate.

However, to accommodate various clock rates, resonant clock circuits may need to be adjusted to accommodate different resonant frequencies. To minimize clock distortion, in this disclosure a transition between a non-resonant clock mode and a resonant clock mode is done over a series of clock cycles. A clock distribution network may be operated in a variety of resonant or non-resonant clock modes based upon the clock frequency and power savings requirements. Transitioning between non-resonant and resonant clock modes may include changing (e.g. reducing or increasing) a strength of a clock sector driver (also referred to as clock sector buffer) over a series of clock cycles, and modifying individual ones of a plurality of resonant switches associated with resonant circuits in coordination with changing the strength of the clock sector driver. The resonant switches may be controlled to gradually enable (e.g. stepwise) quantities of the resonant switches corresponding to resonant circuits. As resonant circuits are added to the clock distribution network, the clock mode is changed from non-resonant clock mode to resonant clock mode. Changes to a tunable resistor associated with each resonant circuit may also be used to gradually enable the resonance properties of each resonant circuit over a series of clock cycles.

Clock distortion (e.g. clock cycle compression or jitter, and clock skew) is reduced by controlling a clock sector driver and individual ones of a plurality of resonant switches with gradual changes over a series of clock cycles during the transition between a non-resonant clock mode and a resonant clock mode. Furthermore, various transitions between different resonant and non-resonant clock modes may be made during normal operation of the integrated circuit.

FIG. 1 is a graph 100 illustrating power savings over traditional non-resonant clock mode based upon two example resonant frequencies. A first curve 110 shows a high-frequency resonant mode. For example, the LC circuits associated with the resonant clock mesh may be configured with smaller capacitance and/or smaller inductance so that the resonant frequency of the LC circuits is higher frequency. A second curve 120 shows a low-frequency resonant mode which has different electrical properties for the LC circuit tuned for lower frequency resonance. As illustrated in the graph 100, at frequencies above 3.5 GHz, the high-frequency resonant mode associated with curve 110 provides a greater power savings. At frequencies from 3.5 GHz down to 2.5 GHz, the low-frequency resonant mode associated with curve 120 provides greater power savings. Finally, for some frequencies (not shown, e.g. below 2.5 GHz) it may be desirable to use a non-resonant mode for the global clock distribution network. A third curve 130 shows relative power cost associated with operating at a non-resonant clock mode in an embodiment of the present disclosure as compared to a traditional non-resonant clock mode. As shown in the graph 100, the curve 130 indicates negative power savings (e.g. additional power needed) to operate at a non-resonant clock mode at some frequencies. As described in further detail below, the global clock distribution network in the present disclosure is capable of operating at both resonant and non-resonant modes. The global clock distribution network includes circuitry to allow for both modes, which adds some additional power requirements for non-resonant clock mode as compared to traditional non-resonant clock mode. In this disclosure, a mixed clock mode system is capable of operating at various frequencies using resonant or non-resonant clock modes.

Figure 2:
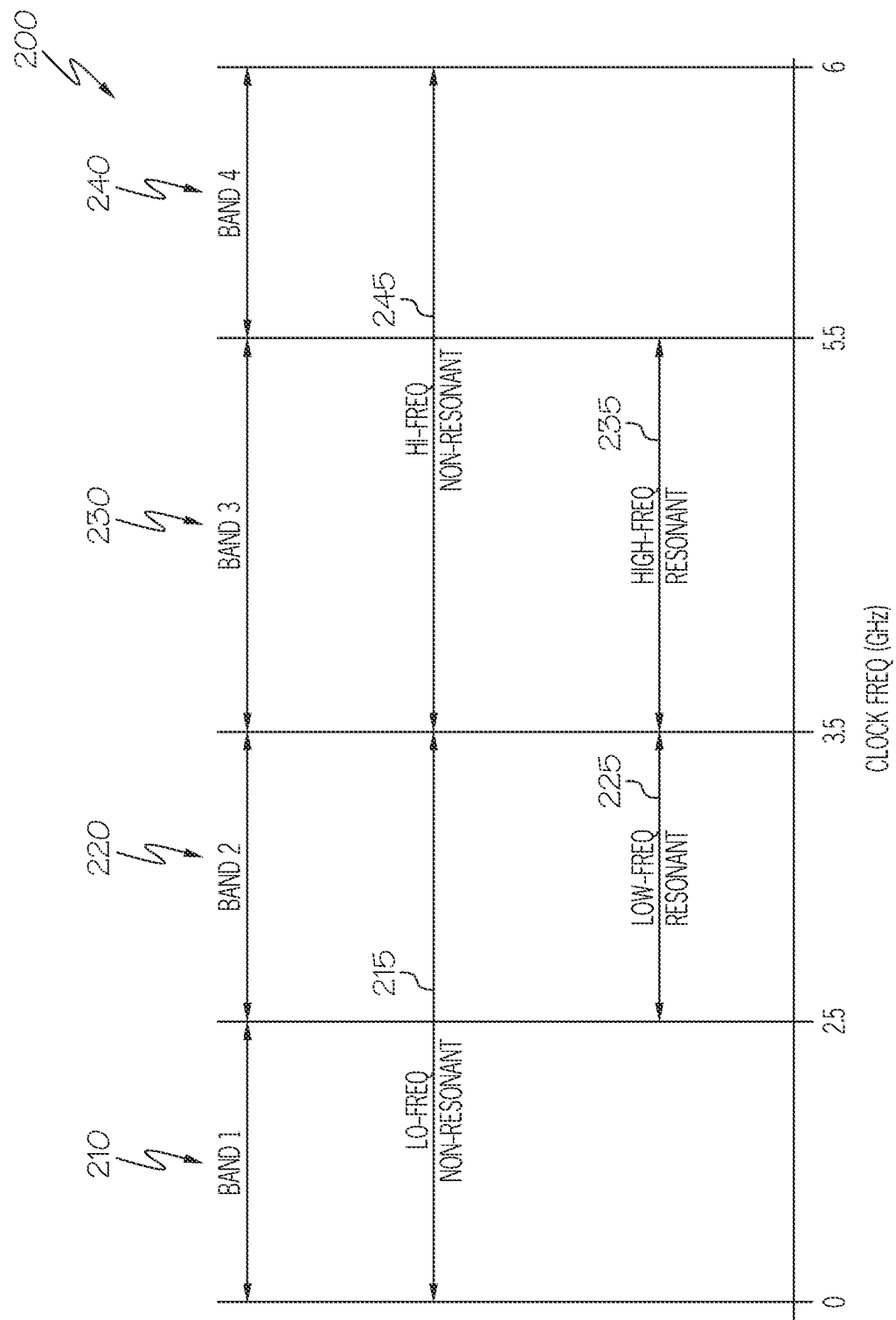
FIG. 2 depicts an example frequency range chart and associated resonant and non-resonant clock modes that may be used at various frequency ranges in accordance with an embodiment of the present disclosure.

FIG. 2 illustrates an example frequency range chart 200 that has four bands of operation. It should be understood that more than four bands of operation may be used in a mixed clock mode system and that the frequencies in FIG. 2 are used as a non-limiting illustrative example. In the frequency range chart 200, a first band 210 ranges from 0 GHz to 2.5 GHz clock frequency. A second band 220 ranges from 2.5 GHz to 3.5 GHz clock frequency. A third band 230 ranges from 3.5 GHz to 5.5 GHz clock frequency. A fourth band 240 ranges from 5.5 GHz to 6.0 GHz (or higher) clock frequency. The frequencies associated with each example band are for example purposes and not intended to be limiting in this disclosure.

For each band of clock frequency, there may be one or more clock modes that are optimal for power savings or performance. For example, the first band 210 in FIG. 2 may perform better using a low frequency non-resonant clock mode 215. The low frequency non-resonant clock mode 215 may perform well for frequencies between 0 GHz and 3.5 GHz clock frequency, covering both the first band 210 and second band 220. At the second band 220, as an alternative to the low-frequency non-resonant clock mode 215, a low-frequency resonant clock mode 225 may be desirable. For example, the low-frequency resonant clock mode 225 may utilize less power than the low-frequency non-resonant clock mode 215. At the third band 230, a high-frequency resonant clock mode 235 or a high-frequency non-resonant clock mode 245 may be used. The high-frequency clock mode 245 is appropriate for frequencies above 3.5 GHz, which include both the third band 230 and the fourth band 240.

As shown in FIG. 2, a flexible clock distribution system may be capable of transitioning between various frequencies and resonant or non-resonant clock modes, depending on the clock frequency. For example, as an integrated circuit increases the clock frequency from a frequency in the first band 210 to a frequency in the second band 220, the integrated circuit may transition from the low-frequency non-resonant clock mode 215 to the low-frequency resonant clock mode 225. The transition may not occur exactly at the border between the bands (e.g. 2.5 GHz) but may occur at any frequency within or near the frequency range associated with the second band 220. As the clock frequency increases to the transition between the second band 220 and the third band 230, the clock mode may be changed. For example, a clock distribution network utilizing the low-frequency resonant clock mode 225 may transition to the high-frequency resonant clock mode 235 or may transition to the high-frequency non-resonant clock mode 245.

In some implementations, the integrated circuit may transition from a resonant clock mode to a non-resonant clock mode before transitioning to a different resonant clock mode. By limiting the transition paths between various resonant clock modes, complexity for a clock mode controller may be reduced. The clock mode controller may have a stored transition plans for transitions between non-resonant clock mode and resonant clock modes. For example, when moving from a low-frequency resonant clock mode to a high-frequency resonant clock mode, it may be desirable to move from the low-frequency resonant clock mode to a non-resonant clock mode first (using a first stored transition plan) and then from the non-resonant clock mode to the high-frequency resonant clock mode (using a second stored transition plan). Therefore, it may not be necessary for the clock mode controller to store a transition plan to go directly from a low-frequency resonant clock mode to a high-frequency resonant clock mode.

To aid in the configuration of resonant clock modes, four values may be configured. The values may be programmable depending on circuit characterization, but may be static during run time operation of the integrated circuit. A first value, Low Frequency Resonant Lower limit (LFRLower) defines the Pstate (frequency) for the lower end of the low-frequency resonant clock mode 225 band. A second value, Low Frequency Resonant Upper limit (LFRUpper) defines the Pstate (Frequency) for the upper end of the low-frequency resonant clock mode 225 band. A third value, High Frequency Resonant Lower limit (HFRLower) defines the Pstate (Frequency) for the lower end of the high-frequency resonant clock mode 235 band. A fourth value, High Frequency Resonant Upper limit (HFRUpper) defines the Pstate (Frequency) for the upper end of the high-frequency resonant clock mode 235 band. Note that the LFRUpper and HFRLower may not be coincident, and are likely to be set such that there is a slight overlapping of the low-frequency resonant clock mode 225 band and the high-frequency resonant clock mode 235 band. A further value, Full Clock Sector Buffer (FCSB) is a value that defines the Pstate (Frequency) for the point at which clock sector buffers should be at full strength to support Vmin operation. The FCSB will occur in the first band 210 (or at some minimum threshold of the first band 210). Note the strength of the clock sector buffer is the amount of current driven by the clock sector buffer (also known as clock driver).

In a flexible clock distribution system, an integrated circuit may have the ability to choose the appropriate clock mode based on power consumption limitations, integrated circuit performance requirements, and/or the above identified operating values. Tuning capability of the clock distribution network may be used to provide flexibility between resonant and non-resonant clock modes at various frequencies. However, switching between resonant and non-resonant clock modes requires consideration of clock distortion to make sure that clock jitter and clock slew are within tolerable limits. Upon the enablement of the resonance clock circuits, extra energy will be introduced onto the clock mesh which may temporarily overdrive the mesh. Overdriving the clock mesh unintentionally creates a short clock cycle. A short clock cycle (in which clock cycle becomes compressed below the normal clock cycle time) can cause performance problems in the integrated circuit. An integrated circuit may be more tolerant to long clock cycles, but short clock cycles may negatively impact the integrated circuit. For example, a short clock cycle could result in loss of data moving between parts of the integrated circuit, miscalculations, or unsynchronized integrated circuit operations. Utilizing stepwise tuning of LC circuits and clock buffers for switching between resonant and non-resonant clock modes ensures that clock cycle compression and clock slew are within tolerable limits.

When transitioning from non-resonant clock mode to a resonant clock mode, it is desirable to compensate for potential short clock cycles while not having to account for extra voltage in the transition for timing margin. Two elements are gradually controlled: 1) the clock sector buffer strengths are stepped to a weaker setting and 2) tunable resonant switches that control the amount of current that can be released by the inductor are stepped to stronger amounts. Conversely, when the resonant circuit is disabled, the reverse needs to occur: 1) step the tunable resonant switches associated with various inductors off and 2) step the clock sector buffers to a stronger setting. In this disclosure, tunable resonant switches are used in conjunction with a clock distribution network to provide granular control over various inductors in the clock distribution network.

Figure 3:
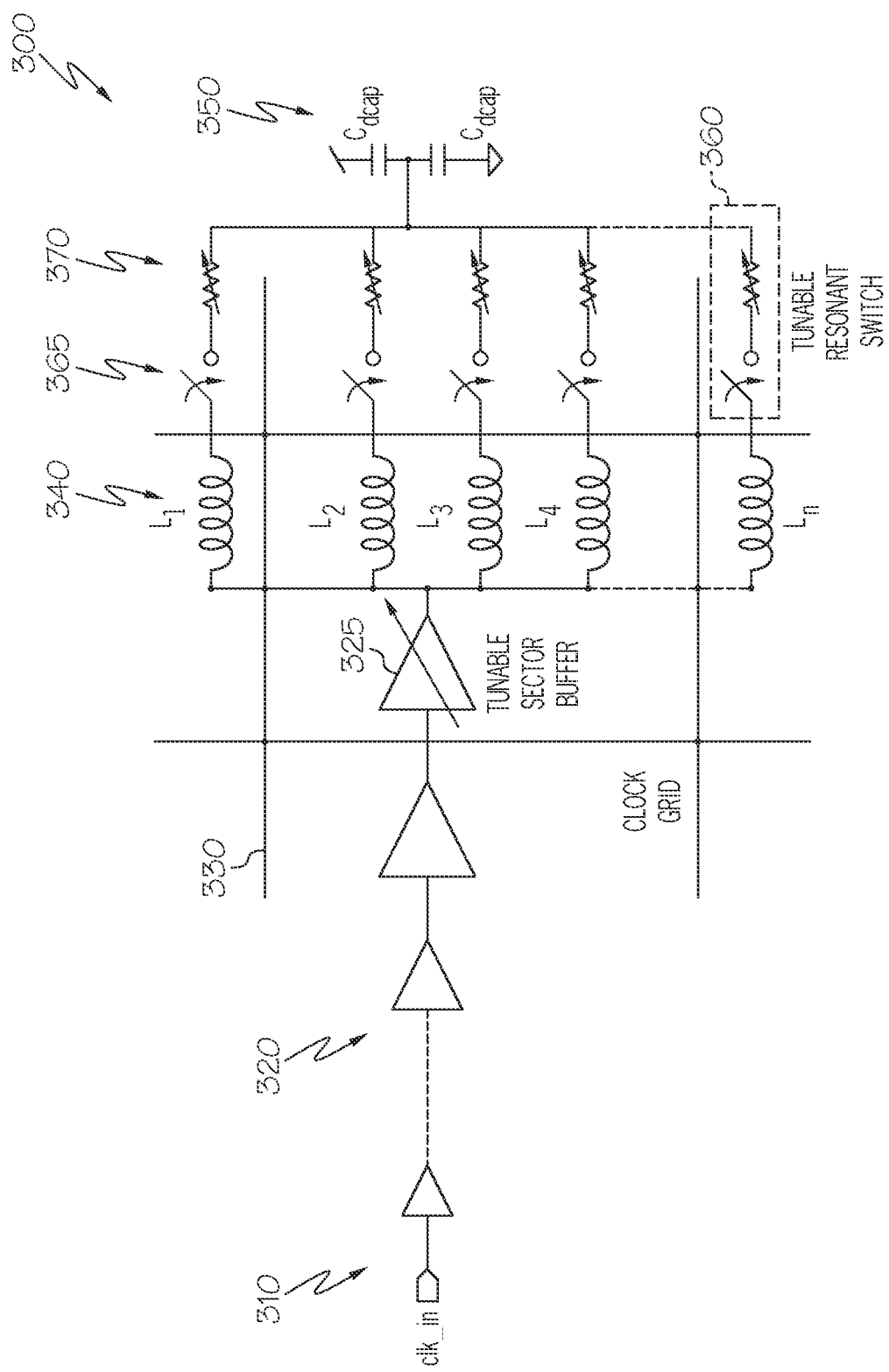
FIG. 3 depicts a sector clock distribution network capable of both resonant and non-resonant clock modes in accordance with an embodiment of the present disclosure.

FIG. 3 illustrates an example sector 300 of a clock distribution network. The sector includes a clock source 310, indicated as clk_in. The clock source 310 provides a global clock signal that is distributed via the clock distribution network. In the example of FIG. 3, a clock tree 320 may be present to carry the clock signal to the sector. At the sector, a tunable sector buffer 325 is placed between the global clock signal and the sector clock grid 330. The sector clock grid 330 may be a wire mesh connected to various components in the example sector of the integrated circuit.

The sector clock grid 330 distributes the global clock signal in the sector. The sector clock grid 330 is connected to inductors $L_1, L_2, L_3, L_4, \ldots L_n$, including an example inductor $L_1$ 340. The inductors make up the L portion of the LC circuit. Together with the inductors, the capacitance $C_{deap}$ 350 is included in the circuit holding the sector clock grid 330. The inductors and capacitance are used in resonant clock mode.

In contrast to traditional LC circuits used in resonant clock mode, the LC circuit in FIG. 3 also includes a plurality of tunable resonant switches, such as tunable resonant switch 360 which separate each inductor from the capacitance. The tunable resonant switches may include a switch, such as example switch 365 and a tunable resistor (also referred to as a resonant driver), such as tunable resistor 370. The components of the tunable resonant switches allow for the effect of each inductor to be enabled or disabled and for the modification of the resonant frequency. Each switch (such as example switch 365) controls a corresponding resonant circuit (such as example inductor $L_1$ 340, acting with the capacitance $C_{deap}$ 350). Studying FIG. 3 as an example, the example inductor $L_1$ 340 and capacitance 350 may provide resonant clocking when the example switch 365 is closed. When the example switch 365 is closed, energy exchanged among the capacitance associated with the clock grid 330, the capacitance 350, and the example inductor 340 provide for resonant clocking.

Each corresponding resonant circuit may also have a tunable resistor (such as example tunable resistor 370). The example tunable resistor 370 may be used to adjust the resistance for energy being exchanged between the capacitance 350 and the example inductor 340. Together the tunable resistors and the tunable sector buffer may be adjusted based upon the frequency of the clock signal being propagated through the sector clock grid 330. Specifically, the tunable resistor 370 may be modified to control the conductance of the resonant circuit. Damping or undamping the circuit over a series of clock cycles may be desirable to minimize clock distortion while changing clock modes. The conductance of the tunable resistor 370 may be varied along the continuum from an open circuit (e.g. acting as an open switch 365) to a finite maximum conductance. Changes to the conductance could be done in coordination with changes to the switch 365. For example, the conductance of the tunable resistor 370 may be changed in combination with changing the switch 365 for a particular resonant circuit. Alternatively, all tunable resistors (for multiple corresponding resonant circuits) may be changed gradually from open circuit to their maximum conductance over a series of clock cycles. In one example, the switches (e.g. example switch 365) are closed (e.g. enabling the use of the resonant circuit), but the tunable resistors are swept gradually from minimum to maximum (or vice versa) conductance to enable (or disable) the resonant circuit.

In non-resonant mode, all tunable resonant switches of the sector may be opened (disabling the exchange of energy between the inductors and the capacitance). Therefore in the non-resonant mode, the clock signal would come entirely from the clock source 310, via the clock tree 320 and through the tunable sector buffer 325. Therefore, more power would be required in non-resonant mode to make sure the clock signal is fully propagated.

In resonant mode, some or all of the tunable resonant switches of the sector may be closed (enabling the exchange of energy between the inductors and the capacitance 350 (including any capacitance associated with the clock grid 330), resulting in a resonant LC circuit). The LC circuit provides recycling of some of the energy being exchanged between the inductors and the capacitance, which results in power savings as compared to the non-resonant mode. The amount of resonance being used in the LC circuit may be controlled by the way in which the tunable resonant switches are adjusted in dependence on the mode. Specifically, when moving between a resonant clock mode and a non-resonant clock mode, it may be desirable to adjust ones of the tunable resonant switches in a stepwise manner to avoid potential short clock cycles (clock compression) during the transition between clock modes.

Figure 4:
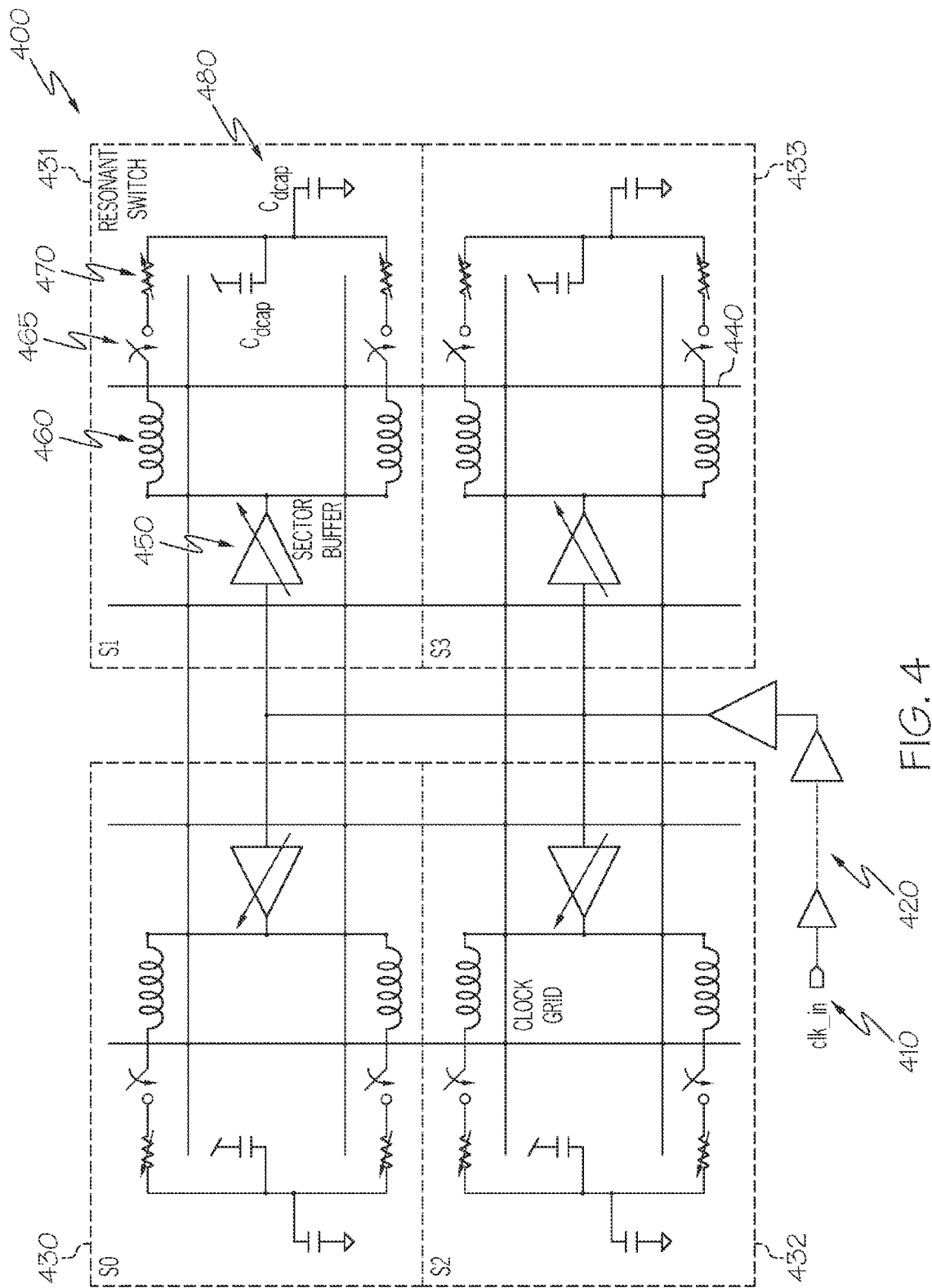
FIG. 4 depicts an example integrated circuit having four sectors with capability of resonant and non-resonant clock modes in accordance with an embodiment of the present disclosure.

FIG. 4 is an illustration of a four-sector integrated circuit 400 having four sectors 430, 431, 432, 433. It should be understood that implementations of integrated circuits may have a single sector or a plurality of sectors. In FIG. 4, a global clock source 410 provides a global clock signal via a clock distribution network (shown as a clock tree 420) to the tunable sector buffers for each sector, including tunable sector buffer 450 in the S1 sector 431. The tunable sector buffers distribute the global clock signal to a clock grid 440. In FIG. 4, a common clock grid (also referred to as a "single grid") is used for the four-sector integrated circuit 400. Due to the nature of the clock signal and the LC circuits at each sector, the common clock grid may be a wire mesh among the sectors without creating clock distortion. However, in some implementations, each sector could have a separate clock grid (also referred to as differential grids), which may be helpful, for example when the sectors independently may be operated at different resonant or non-resonant clock modes.

Each sector 430, 431, 432, 433 in FIG. 4 has two inductors and each inductor is connected via a tunable resonant switch to a capacitance element. For brevity, only an example provided in Sector S1 431 are labeled with reference numerals. Example inductor 460 is located between the clock grid 440 and the tunable resonant switch. The tunable resonant switch includes example switch 465 and tunable resistor 470. The tunable resonant switch is connected to the capacitance 480. Similar to the description in FIG. 3, each inductor may be independently enabled or disabled by controlling the tunable resonant switch associated with each inductor.

Figure 5:
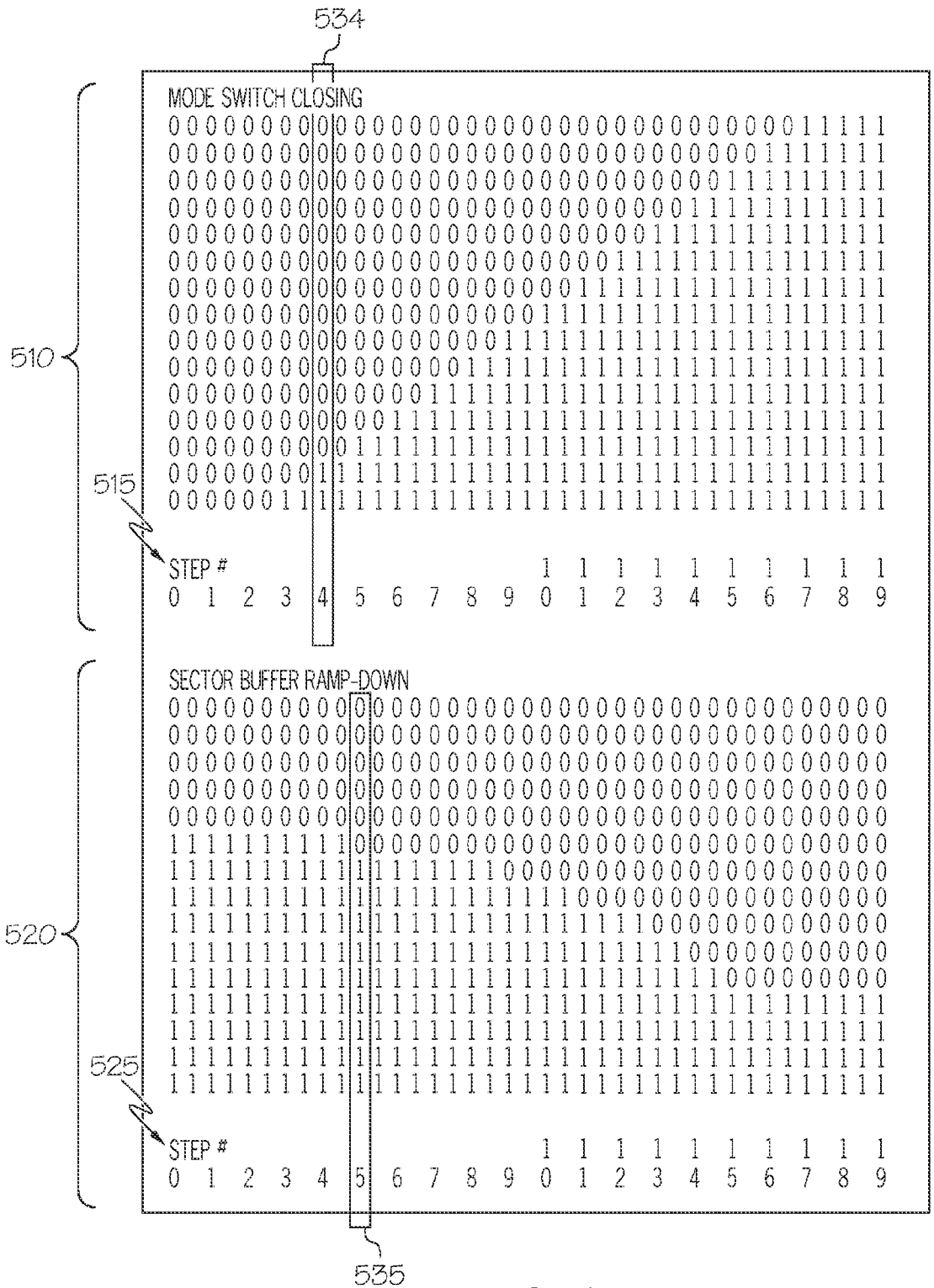
FIG. 5 depicts a specific implementation of stepwise control of tunable resonant switches when changing from non-resonant to resonant clock mode in accordance with an embodiment of the present disclosure.

FIG. 5 depicts a specific implementation of stepwise control of tunable resonant switches (such as tunable resonant switches 360 in FIG. 3) and a sector buffer when changing from non-resonant to resonant clock mode. In FIG. 5, a first chart 510 shows how tunable resonant switches may be activated in a stepwise manner over the course of twenty steps 515, listed as steps 0-19. In one implementation, each step may be associated with a single clock cycle. However, it should be understood that each step may be associated with multiple clock cycles in other implementations. Each column in the first chart 510 represents a step in the stepwise transition from non-resonant clock mode to a resonant clock mode. Each row in the first chart 510 represents a tunable resonant switch. There are sixteen tunable resonant switches in the example associated with FIG. 5.

In the first chart 510, at step 0, there are zeros indicated for all sixteen of the tunable resonant switches. Since all tunable resonant switches are open, none of the inductors associated with the tunable resonant switches are capable of providing resonant energy exchange with the capacitance. Therefore, at step 0, the clock distribution network is operating in a non-resonant clock mode. Gradually, individual ones of the tunable resonant switches are closed (thus enabling the corresponding resonant circuit associated with the closed resonant switch), starting at step 3 in the first chart 510. At step 4, two of the resonant switches are closed, as indicated by the two "one" values in column 534. As apparent in the first chart 510, the tunable resonant switches are gradually activated in a linear stepwise manner, starting at step 3 and continuing until step 17, at which time all tunable resonant switches have been closed. Over the course of several clock cycles, the inductance of the clock grid has been increased by gradually enabling the inductors associated with each of the tunable resonant switches.

It should be understood that the tunable resonant switches may be closed in a linear stepping manner, but with non-linear step sizes in the programmable switch conductance. Other embodiments may use non-linear stepping, linear step sizes, or some other combination to achieve the turn-on characteristics required. It should be understood that the enabling of corresponding resonant circuits by closing the tunable resonant switch may be combined with other changes. For example, by changing the damping level (conductance) of the tunable resistor for each resonant circuit, the resonant circuit may be integrated more gradually, and causing less disruption to the clock distortion.

As noted above, as the inductors are added to the clock distribution network, the energy at the clock distribution network increases and it is necessary to decrease the amount of energy coming from the clock source (via the sector buffer). The second chart 520 in FIG. 5 illustrates how a sector buffer might be controlled in coordination with the stepwise transition from non-resonant clock mode to resonant clock mode. Each column in the second chart 520 represents a step in the stepwise transition from non-resonant clock mode to a resonant clock mode. The zeros and ones in each column indicate the strength of one or more tunable sector buffers placed between the clock source and the clock distribution network (e.g. the tunable sector buffer 325 of FIG. 3 or tunable sector buffers 450 of FIG. 4)

In the second chart 520, at step 0, the sector buffer strength is indicated as '0000011111111111.' The sector buffer at step 0 is at higher buffer strength to support non-resonant clock mode as compared to a lower sector buffer strength needed for resonant clock mode. The strength of the sector buffer may be controlled using power steps which are indicated by the ones or zeros as "steps" in the sector buffer strength. In the example implementation, there are 16 power steps. The steps may be linear or geometric. For example, the step sizes may increase from smaller to larger step sizes for each step. In another example, the steps may be equal sizes so that 100% of the power is divided into 16 steps (each step representing 6.25% power). In the equal step scenario, the value '0000011111111111' at step 0 represents 11 steps of 6.25% each for a total sector buffer strength of 68.75%. In the interest of brevity, the sector buffer strength is represented as a 16-bit binary value in this disclosure, which represents 16 power level steps (having either linear or non-linear step sizes).

At step 5, the sector buffer strength is decreased by one level, as indicated by the values '0000001111111111' in column 535. As apparent in the second chart 520, the sector buffer strength is gradually decreased in a non-linear stepwise manner, starting at step 5 and continuing until step 15, at which time the sector buffer strength has reached a lower strength needed for resonant clock mode. Over the course of several clock cycles, the sector buffer strength (in the second chart 520) has been gradually decreased in a stepwise manner coordinated with the stepwise changes of the tunable resonant switches (in the first chart 510). It should be understood that the sector buffer strength may be changed in a linear or non-linear pattern depending on the application requirements. In a first embodiment, the step sizes are non-linear and stepping is non-linear.

Another feature in the implementation shown in FIG. 5 is the start and end of the stepwise transition from non-resonant to resonant clock mode. The stepwise pattern leaves unused dynamic ranges for both stronger and weaker buffers and for hardware learning. For example, the sector buffer levels 0-3 are always on and the sector buffer levels 10-15 are always off. These unused dynamic ranges provide the ability for additional tuning to compensate for hardware shifts, design errors, load differences, and other problems that may manifest in a manufactured product.

While FIG. 5 is an illustration of a transition from non-resonant to resonant clock mode, it should be understood that a similar stepwise pattern (perhaps reverse of the patterns in FIG. 5) would be used for a transition from resonant to non-resonant clock mode. Furthermore, other patterns may be used for transitioning between different resonant frequencies or as needed to adjust for various clock signal strength. In other implementations, stepwise patterns may include or be replaced by a gradual change to the conductance of the tunable resistors (such as tunable resistors 370 in FIG. 3, part of the tunable resonant switch). Furthermore, patterns for stepwise transition between resonant and non-resonant clock modes may be dynamically altered based on electrical characteristics (such as capacitance and inductance) determined for the particular integrated circuit chip.

Figure 6:
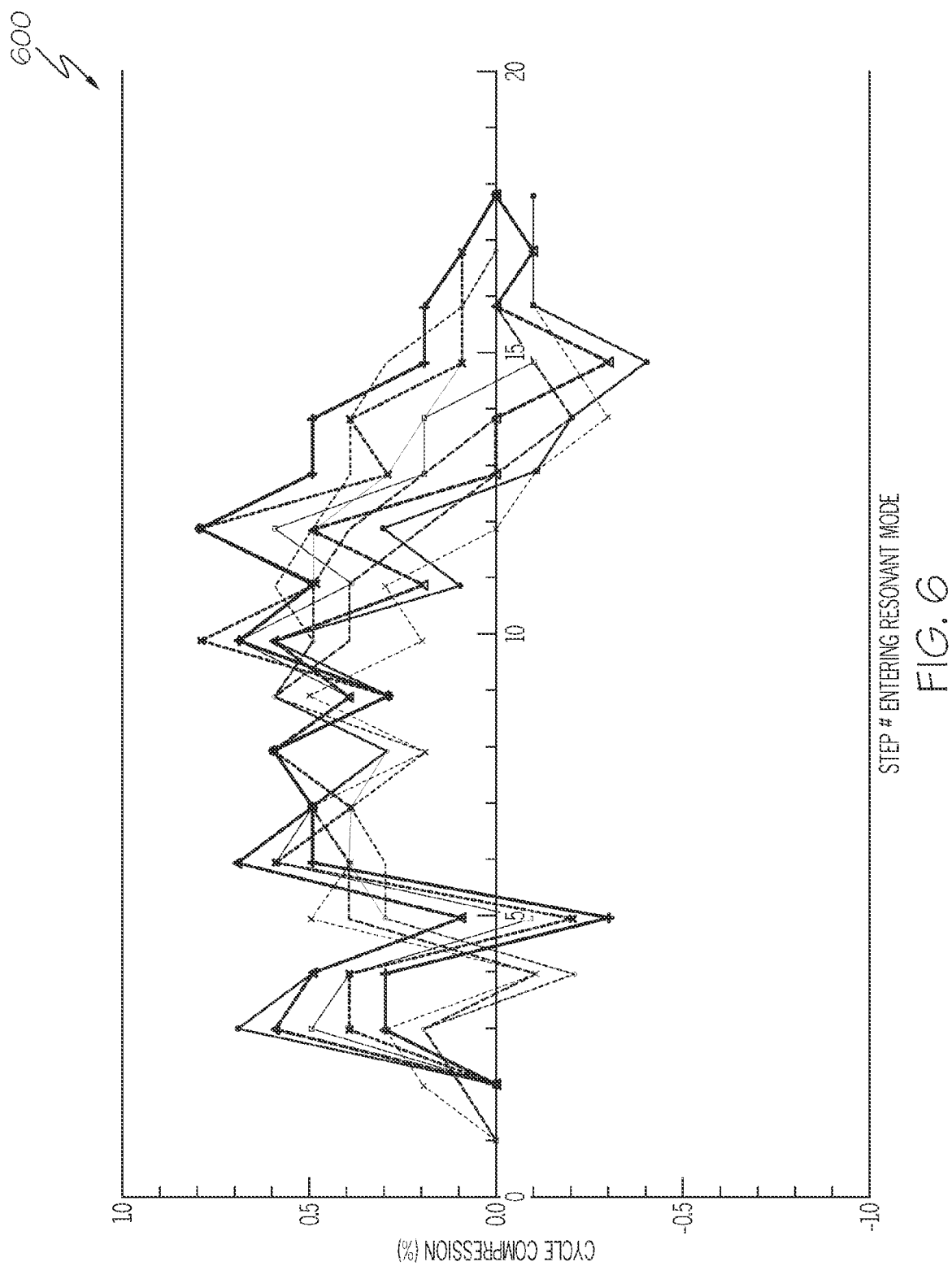
FIG. 6 depicts an example simulation of clock cycle compression expected based upon stepwise control of tunable resonant switches in accordance with various embodiments of the present disclosure.

FIG. 6 includes a chart showing the results of controlling tunable resonant switches based upon an example stepwise transition pattern (such as the pattern described in FIG. 5). The chart 600 shows several line plots of expected clock cycle compression. Each line plot indicates the clock cycle compression associated with a transition from non-resonant to resonant clock mode at particular frequencies. For example, the line plots include transitions from non-resonant to resonant clock modes at 5.5 GHz, 5.0 GHz, 4.5 GHz, 4.0 GHz, and 3.5 GHz clock frequency. In each line plot, the resulting cycle compression was less than 1%. Cycle compression is measured as a time period for a short clock cycle compared to the actual clock cycle at the clock source. As can be seen by the chart 600, the stepwise transition pattern was helpful in keeping the cycle compression below a tolerable threshold (1%/a) for the example system.

Figure 7:
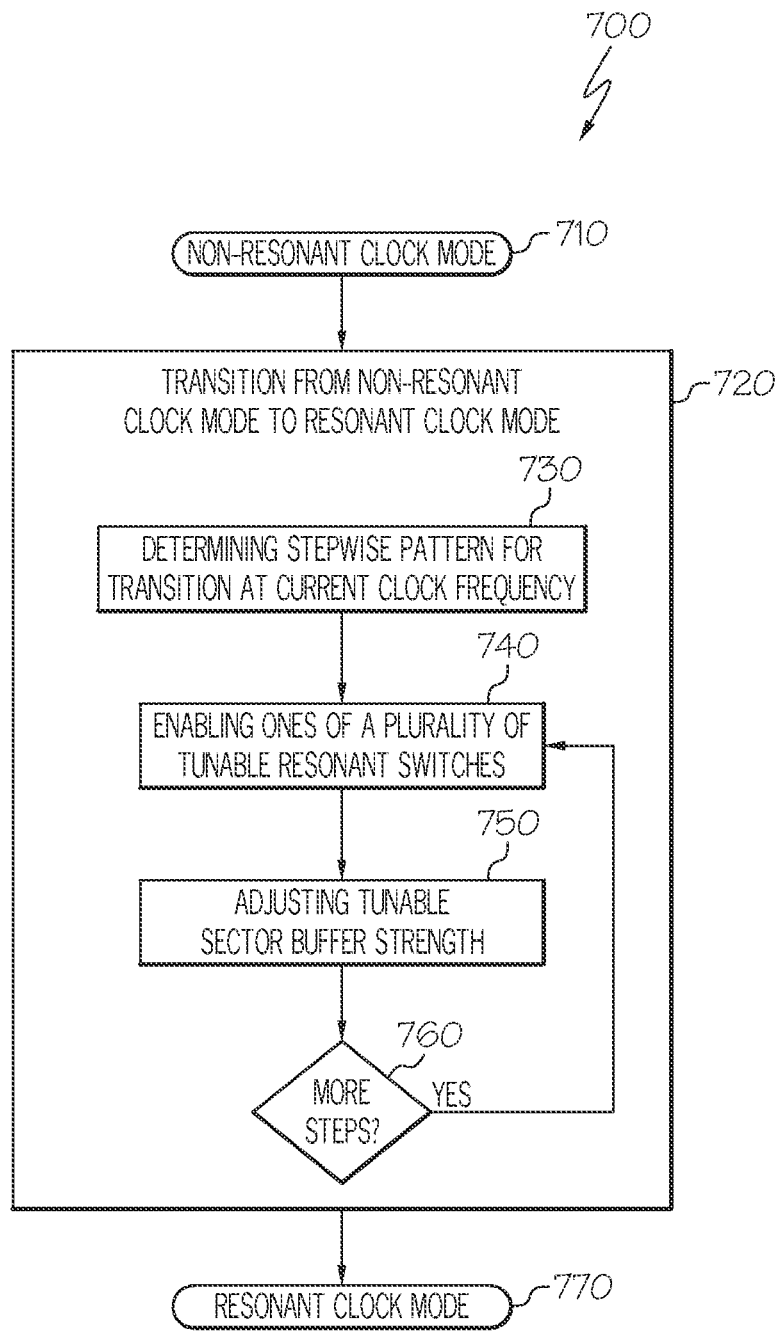
FIG. 7 depicts a flowchart of changing between a non-resonant and a resonant clock mode in accordance with an embodiment of the present disclosure.

FIG. 7 depicts an example flowchart 700 of changing between a non-resonant and a resonant clock mode. At 710, the integrated circuit is operating in a non-resonant clock mode. At 720, a clock distribution network of the integrated circuit transitions from the non-resonant clock mode to a resonant clock mode. Transition from the non-resonant clock mode to the resonant clock mode involves controlling a plurality of tunable resonant switches of a clock distribution network to transition between the non-resonant clock mode 710 and a resonant clock mode 770. For example, block 720 may include gradually changing individual ones of the plurality of tunable resonant switches over a series of clock cycles.

Block 720 may be described in terms of operations performed by a clock mode controller. At block 730, the clock mode controller determines a stepwise pattern to use for the transition from the non-resonant clock mode 710 to the resonant clock mode 770. For example, the clock mode controller may dynamically calculate a stepwise transition pattern, or may retrieve a predefined stepwise transition pattern from a memory storage located on the integrated circuit. The stepwise transition pattern may be adjusted based on environment variables, clock frequency, measured inductance or capacitance of the clock distribution network, or other factors. In some embodiments, the stepwise transition pattern is predetermined and is based upon the frequency at which the clock distribution network is expected to transition from the non-resonant clock mode to the resonant clock mode (such as LFRLower, described above). The stepwise transition pattern includes stepwise adjustments for a series of clock cycles. An example of the stepwise transition pattern may be found in FIG. 5.

At block 740, the clock mode controller enables individual ones of a plurality of tunable resonant switches, in accordance with the current step being performed in the stepwise transition pattern. At block 750, the clock mode controller may adjust the buffer strength of one or more tunable sector buffers in accordance with the current step being performed in the stepwise transition pattern. At step 760, if there are more steps to perform, the process flow returns to block 740 at the start of the next step in the stepwise transition pattern.

It should be understood that while FIG. 7 is described in terms of a transition from non-resonant clock mode 710 to resonant clock mode 770, the same process may be performed for transitions from a resonant clock mode to a non-resonant clock mode, or between different operating points for resonant clock modes.

Figure 8:
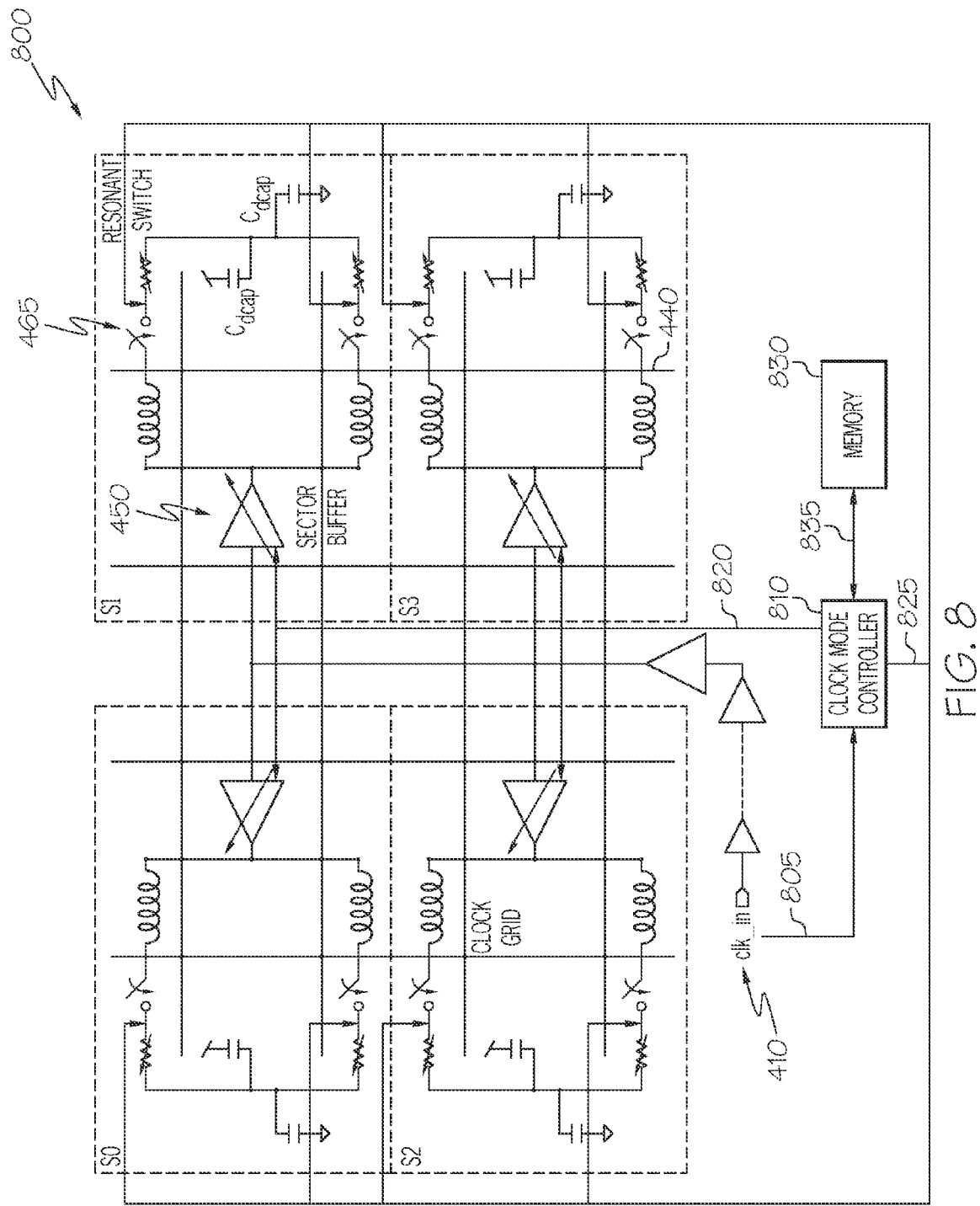
FIG. 8 depicts a system and memory for controlling transitions between non-resonant and resonant clock modes in accordance with various embodiments of the present disclosure.

FIG. 8 depicts a system 800 and memory for controlling transitions between non-resonant and resonant clock modes. As an example for illustrative purposes, the four-sector integrated circuit 400 described in FIG. 4 is shown. Also shown in FIG. 8 is a clock mode controller 810. The clock mode controller 810 may take a clock input 805 from the clock source 410. The clock mode controller 810 is connected (shown as arrows 820) to the clock sector drivers. It should be understood that there may be separate control connections for each clock sector driver in some implementations. In the example in FIG. 8, all clock sector drivers are connected to a single control circuit 820 from the clock mode controller 810. The clock mode controller 810 also has control circuitry (shown as arrows 825) to each of the tunable resonant switches in the clock distribution network. Similarly, in some implementations, the clock mode controller 810 could have separate control circuits for each resonant switch or group of switches. Alternatively, control singles over the control circuitry could indicate commands for individual ones of the resonant switches connected to the control circuitry. In either event, the clock mode controller 810 has the capability of controlling individual ones of the resonant switches to enable corresponding resonant circuits associated with each resonant switch.

The clock mode controller 810 is configured to control the strength of the clock sector driver and the individual ones of the resonant switches over a series of clock cycles to control transition between resonant and non-resonant clock modes or frequencies. The pattern used for transitions from various clock modes may be stored in memory 830 and accessed 835 by the clock mode controller 810. In some implementations, the clock mode controller may be a state machine or may be a hardware-based controller. In some implementations, the clock mode controller is a block of logic with a number of registers that can be programmed by the firmware. The registers may determine the start and stop thresholds for each clock mode, as well as steps and/or step sizes for the clock sector driver, resonant switches, and/or tunable resistors. Alternatively, a hard-coded step progression may be stored at the clock mode controller and enabled by setting a bit in a control register.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
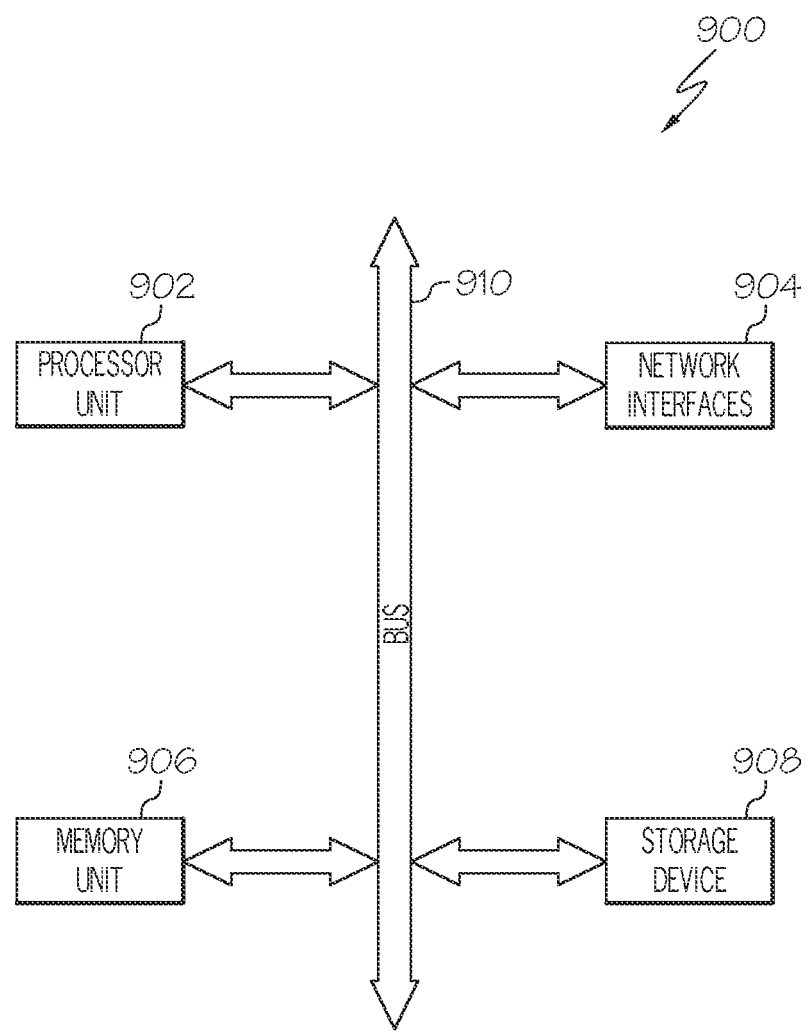
FIG. 9 is an example block diagram illustrating a computer system in which non-resonant and resonant clock modes may be used in accordance with an embodiment of this disclosure.

FIG. 9 depicts an example computer system in which an integrated circuit may transition between a non-resonant clock mode and a resonant clock mode. A computer system includes a processor unit 902 (possibly including multiple processors, multiple cores, multiple nodes, and/or implementing multi-threading, etc.). The computer system includes memory 906. The memory 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 910 (e.g., PCI, ISA, PCI-Express, HyperTransport®, InfiniBand®, NuBus, etc.), a network interface 904 (e.g., an ATM interface, an Ethernet interface, a Frame Relay interface. SONET interface, wireless interface, etc.), and a storage device(s) 908 (e.g., optical storage, magnetic storage, etc.). The system memory 906 embodies functionality to implement embodiments described above. For example, the system memory 906 may include one or more functionalities that facilitate controlling transitions between non-resonant and resonant clock modes in a stepwise manner over a plurality of clock cycles. Any one of these functionalities may be partially (or entirely) implemented in hardware and/or on the processor unit 902. For example, the functionality may be implemented with an application specific integrated circuit, in logic implemented in the processing unit 902, in a co-processor on a peripheral device or card, etc. Further, realizations may include fewer or additional components not illustrated in FIG. 9 (e.g., video cards, audio cards, additional network interfaces, peripheral devices, etc.). The processor unit 902, the storage device(s) 908, and the network interface 904 are coupled to the bus 910. Although illustrated as being coupled to the bus 910, the memory 906 may be coupled to the processor unit 902.

While the embodiments are described with reference to various implementations and exploitations, it will be understood that these embodiments are illustrative and that the scope of the inventive subject matter is not limited to them. In general, techniques for controlling transitions between non-resonant and resonant clock modes as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   transitioning from a non-resonant clock mode to a first resonant clock mode, wherein said transitioning includes:
   reducing a strength of a clock sector driver gradually over a series of clock cycles,
   and
   modifying, over the series of clock cycles, enabled states of individual ones of a plurality of resonant switches associated with resonant circuits while reducing the strength of the clock sector driver.

2. The method of claim 1, further comprising:
   detecting a stimulus to transition between the non-resonant clock mode and the first resonant clock mode, wherein said transitioning is responsive to said detecting.

3. The method of claim 2, wherein said stimulus is based upon change in clock rate beyond a threshold level.

4. The method of claim 1, wherein said plurality of resonant switches includes tunable resonant switches.

5. The method of claim 1, wherein each of the plurality of resonant switches is associated with a corresponding resonant circuit connected to a clock distribution circuit.

6. The method of claim 1, wherein said reducing the strength of the clock sector driver includes gradually changing the strength in stepwise or continuous degrees.

7. The method of claim 1, wherein said modifying individual ones of the plurality of resonant switches includes gradually enabling, in stepwise or continuous quantities, the individual ones of the plurality of resonant switches.

8. The method of claim 1, wherein said modifying individual ones of the plurality of resonant switches includes enabling the individual ones of the plurality of resonant switches in a wave pattern.

9. The method of claim 1, wherein said modifying individual ones of the plurality of resonant switches includes closing the individual ones of the plurality of resonant switches in a linear stepping pattern.

10. The method of claim 9, wherein said modifying individual ones of the plurality of resonant switches includes modifying step sizes associated with linear stepping pattern, the step sizes being non-linear.

11. The method of claim 1, wherein said transitioning further comprises:
    changing, over the series of clock cycles, resistance associated with the resonant circuits in coordination with said changing the strength of the clock sector driver.

12. The method of claim 1, wherein a power consumption associated with a clock source connected to a clock distribution network is dependent upon said transitioning.

13. The method of claim 1, further comprising, prior to said transitioning from the non-resonant clock mode to the first resonant clock mode:
    transitioning from a second resonant clock mode to the non-resonant clock mode.

14. The method of claim 1, wherein the plurality of resonant switches and the clock sector driver are part of a clock distribution network and the clock distribution network includes one or more of a clock tree design, a clock grid design, a clock grid linked to a clock tree, or a clock spine design.

15. The method of claim 1, wherein the plurality of resonant switches and the clock sector driver are part of a clock distribution network, the method further comprising:
    operating the clock distribution network at a low-frequency non-resonant clock mode for a first band of low frequency clock rates;
    operating the clock distribution network at a low-frequency resonant clock mode for a second band of low frequency clock rates;
    operating the clock distribution network at a high-frequency non-resonant clock mode for a third band of high frequency clock rates; and
    operating the clock distribution network at a high-frequency resonant clock mode for a fourth band of high frequency clock rates.

16. The method of claim 1, further comprising:
    transitioning from the resonant clock mode to the non-resonant clock mode, wherein transitioning from the resonant clock mode to the non-resonant clock mode includes:
    increasing a strength of a clock sector driver over a series of clock cycles, and
    modifying, over the series of clock cycles, individual ones of a plurality of resonant switches associated with resonant circuits in coordination with said changing the strength of the clock sector driver.

17. The method of claim 1, further comprising:
    independently controlling individual ones of the plurality of resonant switches to dynamically alter the inductance of a clock distribution network.

18. The method of claim 16, wherein the individual ones of the plurality of resonant switches are dynamically altered in response to load imbalance.

19. An integrated circuit comprising:
    a clock distribution network configured to receive a clock signal from a clock source, the clock distribution network capable of operating in various resonant or non-resonant clock modes, wherein the clock distribution network is connected to a plurality of resonant switches associated with corresponding resonant circuits; and a clock mode controller configured to control a transition from a non-resonant clock mode to a first resonant clock mode, wherein the clock mode controller is configured to reduce a strength of a clock sector driver gradually over a series of clock cycles, and modify, over the series of clock cycles, enabled states of individual ones of a plurality of resonant switches associated with the corresponding resonant circuits while reducing the strength of the clock sector driver.

20. The integrated circuit of claim 19, further comprising:
a clock source configured to provide the clock signal to the clock distribution network.

21. The integrated circuit of claim 19, wherein the clock mode controller is configured to reduce the strength of the clock sector driver by gradually changing the strength in stepwise or continuous degrees.

22. The integrated circuit of claim 18, wherein the clock mode controller is configured modify the individual ones of the plurality of resonant switches by gradually enabling, in stepwise or continuous quantities, the individual ones of the plurality of resonant switches.

23. A non-transitory computer readable storage medium having computer usable program code embodied therewith for transitioning from a non-resonant clock mode to a first resonant clock mode, the computer usable program code comprising a computer usable program code configured to:

reduce a strength of a clock sector driver gradually over a series of clock cycles, and modify, over the series of clock cycles, enabled states of individual ones of a plurality of resonant switches associated with resonant circuits while reducing the strength of the clock sector driver.

* * * * *